Oct. 12, 1926.

B. RYAN

GUARD FOR PROTECTING OPENINGS TO CASINGS

Filed Nov. 6, 1925

1,602,460

Inventor.
Bernard Ryan
by H. J. S. Dennison
Atty.

Patented Oct. 12, 1926.

1,602,460

UNITED STATES PATENT OFFICE.

BERNARD RYAN, OF NEW YORK, N. Y.

GUARD FOR PROTECTING OPENINGS TO CASINGS.

Application filed November 6, 1925. Serial No. 67,471.

The principal object of the invention is to protect delicate mechanisms or valves arranged within casings against being fouled by loose particles of foreign matter, thereby ensuring the proper operation of the device and reducing the necessity for maintenance service.

The principal feature of the invention consists in providing the passage to the interior of the casing with an annular trap to intercept particles of foreign matter.

In the accompanying drawings, Figure 1 is a sectional view of a portion of a thermostatic gas control device showing the application of my invention thereto.

Many forms of apparatus comprising delicate mechanisms enclosed within casings are frequently impaired by small particles of foreign matter getting into the interior of the casings while the device is being transshipped or installed and particularly devices that have valving functions to control a passage leading thereto or therefrom and to which pipes are connected.

In the cutting of threads in metal very fine particles of the metal are broken away from the walls of the passage and these particles frequently adhere to the thread after the cutting operation has been completed and in shipping and handling the apparatus these partly loosened particles are liable to become freed and find their way into the interior of the casing. Such small particles of metal adhering to valve seats are very detrimental and their presence is not made apparent until after the apparatus has been installed and necessitates repair.

Figure 1:
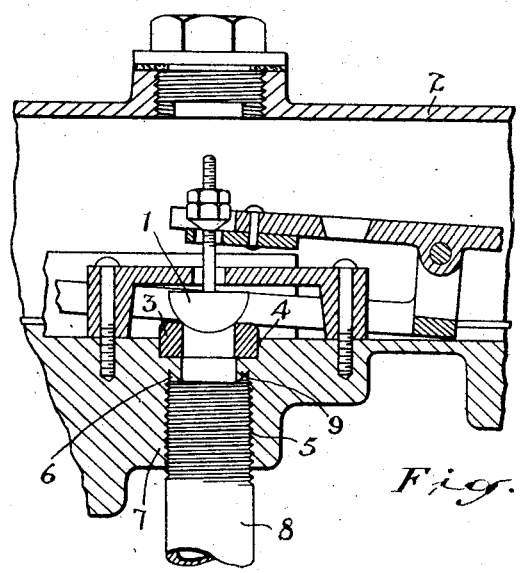

Figure 1 of the drawings illustrates a portion of the mechanism of a thermostatic gas control device showing the valve 1 for controlling the outflow of gas from the chamber within the casing 2. A valve seat 3 is bedded in the counter bore recess 4 at the inner end of the passage 5. The passage 5 is enlarged below the valve seat and its wall is undercut to form a recess 6. The remaining or outer portion of the passage is formed with a threaded wall 7 to receive the threaded end of the pipe 8. The diameter of the smaller portion of the passage 5 is substantially the same as the inner diameter of the pipe 8.

It will be readily seen that the depending lip 9 formed by undercutting the wall of the passage provides a guard which very effectively prevents small particles of metal which may become freed from the wall of the threaded passage or which may enter the passage from the outer end from getting into the inner and smaller portion of the passage 5 and the undercut recess surrounding this lip forms a pocket to retain such particles as may be intercepted by the lip.

The device as shown in Figure 1 is applied to a thermostatic gas control but it may be found applicable for many uses.

Figure 3:
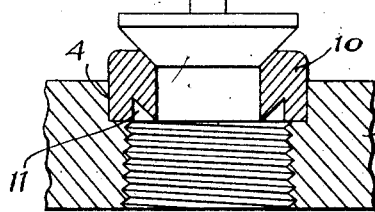
Figures 3, 4 and 5 are enlarged sectional details of modified applications of the invention.
Figure 4:
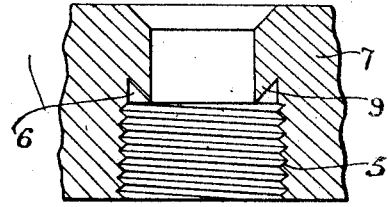
Figure 2:
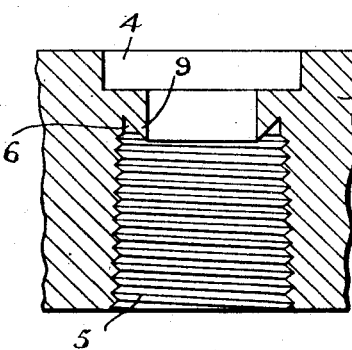
Figure 2 is an enlarged sectional detail of the passage cut in the casing.

In the detail illustrated in Figure 3 the valve seat 10 is formed with an undercut recess 11 in the bottom or outer face which will perform the same function as if the recess were cut in the casing.

Figure 5:
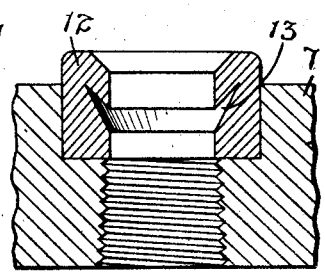

In Figure 5 is shown a further modification in which the valve seat 12 is formed with an annular undercut groove 13 in the inner wall.

It will be readily understood that a casing having passages leading thereinto into which pipes or tubes are to be secured will be protected to a high degree by the use of this present invention from small particles of foreign matter getting into the interior during the handling and installation work.

What I claim as my invention is:

1. A guard for preventing particles of metal from passing through openings into casings, comprising an annular recess undercut in the wall of the opening, the undercut portion of the wall forming the inner side of said recess.

2. A guard for preventing particles of metal from passing through openings into casings, comprising an annular recess formed in the wall of the casing, said recess having an undercut wall on the inward side.

3. A guard for preventing particles of metal from passing through openings into casings, comprising, an opening having its inner portion formed of a smaller diameter than the outer portion, the juncture of the larger and smaller portions of the passage being undercut to form an annular overhanging lip extending outwardly from the smaller diameter.

4. A guard for preventing particles of metal from passing through openings into casings, comprising a passage leading through the wall of the casing having an enlarged threaded outer portion, a tapered annular lip extending angularly inward from the wall of said outer portion, and a reduced inner passage portion extending from the lip.

BERNARD RYAN.